United States Patent [19]

Yoshimura et al.

[11] Patent Number: 4,918,616
[45] Date of Patent: Apr. 17, 1990

[54] TOOL MONITORING SYSTEM

[75] Inventors: Kiyokazu Yoshimura; Norio Miyawaki, both of Kyoto; Hiroyuki Yamada, Osaka; Hideaki Nakamura, Kyoto; Koichi Tshujino, Kyoto; Takaharu Takinami, Kyoto; Tatemitsu Hirayama, Kumamoto; Tatsuhiko Naito, Osaka; Ryoichi Miyake; Takeshi Yamada, both of Kyoto; Tetsuro Iwakiri; Kazuaki Otsuka, both of Kumamoto, all of Japan

[73] Assignee: Omron Tateisi Electronics Co., Kyoto, Japan

[21] Appl. No.: 734,679

[22] Filed: May 16, 1985

[30] Foreign Application Priority Data

May 18, 1984 [JP] Japan .................................. 59-101554
Sep. 28, 1984 [JP] Japan .................................. 59-205338
Oct. 5, 1984 [JP] Japan .................................. 59-210176
Oct. 29, 1984 [JP] Japan .................................. 59-227196

[51] Int. Cl.$^4$ ............................................. G06F 15/46
[52] U.S. Cl. ....................................... 364/507; 364/508; 364/551.02; 364/474.17; 73/587; 340/680
[58] Field of Search ............... 364/507, 474, 511, 475, 364/571, 508, 551.02; 318/565; 73/587, 659, 1 DV; 340/680

[56] References Cited

U.S. PATENT DOCUMENTS

| 3,834,615 | 9/1974 | Watanabe et al. | 364/474 |
| 3,924,456 | 12/1975 | Vahaviolos | 73/587 |
| 4,009,463 | 2/1977 | Vercellotti et al. | 73/587 |
| 4,023,044 | 5/1977 | Miller et al. | 364/475 |
| 4,033,179 | 7/1977 | Romrell | 364/507 |
| 4,043,176 | 8/1977 | Graham | 73/587 |
| 4,471,444 | 9/1984 | Yee et al. | 364/508 |
| 4,574,633 | 3/1986 | Ohnuki et al. | 364/474 |

FOREIGN PATENT DOCUMENTS 0190857 9/1985 Japan .................................. 73/587

OTHER PUBLICATIONS

"Acoustic Emission Monitoring System for Detection of Cracks in Complex Structure", by Nakamura, Materials Evaluation, vol. 29, No. 1, Jan. 1971, pp. 8–12.

Primary Examiner—Errol A. Krass
Assistant Examiner—V. N. Trans
Attorney, Agent, or Firm—Stevens, Davis, Miller & Mosher

[57] ABSTRACT

A tool monitoring system for detecting a tool failure of a tool employed in a tool machine, comprising artificial signal generating unit for generating a predetermined artificial tool failure signal simulating the acoustic emission signal obtained in an actual failure of the tool, acoustic emission transducing unit adapted to be mounted on the tool machine near the tool and driven by the artificial signal generating unit for applying the artificial tool failure signal to the tool machine, acoustic emission sensing unit mounted on the tool machine near the tool so as to receive, in a setting mode of the system where the transducing unit is mounted on the machine, the applied artificial tool failure signal from the acoustic emission transducing unit through the tool machine and, in a monitoring mode of the system where the tool is operated, an acoustic emission from the tool, and signal processing unit for analyzing an output signal generated from the acoustic emission sensing unit to detect the tool failure of the tool.

12 Claims, 12 Drawing Sheets

TOOL MONITORING SYSTEM

BRIEF SUMMARY OF THE INVENTION

This invention relates to a tool monitoring system for monitoring or automatically detecting a tool failure or abnormality in a machine tool by measuring an acoustic emission which is generated when the tool fails or cuts a work.

It is well known that a machine tool abnormally cuts a work if a drill is accidentally broken or clogged with scraps, and the recent progress of factory automation demands that such an accident be automatically detected. To meet with the demand a tool monitoring system has been proposed in which an acoustic emission (hereinafter briefly described as "AE") sensor is disposed near a tool or a work and an AE signal developed from the AE sensor is processed to detect a failure of the tool.

The AE sensor of the proposed tool monitoring system is mounted near a tool or on a work, so that the level of the AE signal generated therefrom varies considerably with its mounting position. A damping factor between the AE sensor and a tool in a machine tool is therefore compensated on a trial and error basis by setting the sensitivity of the AE sensor for a predetermined reference value in accordance with the scale of the tool. Since the AE signal on the tool failure is obtained only when a tool failure actually exists, however, it is difficult to position a mounting location or status and precisely detect an actual tool failure. The conventional tool monitoring system has the further disadvantage that when the type of the tool, such as a drill manner diameter, a cutting condition or the like, is changed, the AE signal level also changes, so that making adjustments in response to AE signal variations becomes complicated resulting in difficult use of the system.

Moreover, the conventional tool monitoring system detects a drill failure on the basis of an average amplitude or a particular frequency of a signal delivered from an AE sensor which is difficult to be separated from other AE noise signals or background noise, such as signals generated from scraps of a work, electric noise by switching a plunger coil, shock sound by contacting a work with a substance or the like, so that the reliability of the system is reduced.

It is therefore a primary object of this invention to provide a tool monitoring system including an AE sensor which is mounted near a tool and a pulser which generates an artificial fool failure signal having the same characteristics as that of a signal actually generated from the AE sensor when the tool fails, whereby precise tool failure detection is ensured without being affected by background noise.

It is further object of this invention to provide a tool monitoring system in which the sensitivity of the AE sensor is able to be set to the optimum condition.

In accordance with this invention, there is provided a tool monitoring system for detecting a tool failure to a tool employed in a tool machine, comprising artificial signal generating means for generating a predetermined artificial tool failure signal simulating the acoustic emission signal obtained in an actusl failure of the tool, acoustic emission transducing means adapted to be mounted on the tool machine near the tool and driven by the artificial signal generating means for applying the artificial tool failure signal to the tool machine, acoustic emission sensing means mounted on the tool machine near the tool so as to receive, in a setting mode of the system where the transducing means is mounted on the machine, the applied artificial tool failure signal from the acoustic emission transducing means through the tool machine and, in a monitoring mode of the system where the tool is operated, an acoustic emission from the tool, and signal processing means for analyzing an output signal generated from the acoustic emission sensing means to detect the tool failure of the tool.

The specific nature of this invention, as well as other objects, uses and advantages thereof, becomes better understood from the description and from the accompanying drawings, in which:

DETAILED DESCRIPTION

Figure 1:
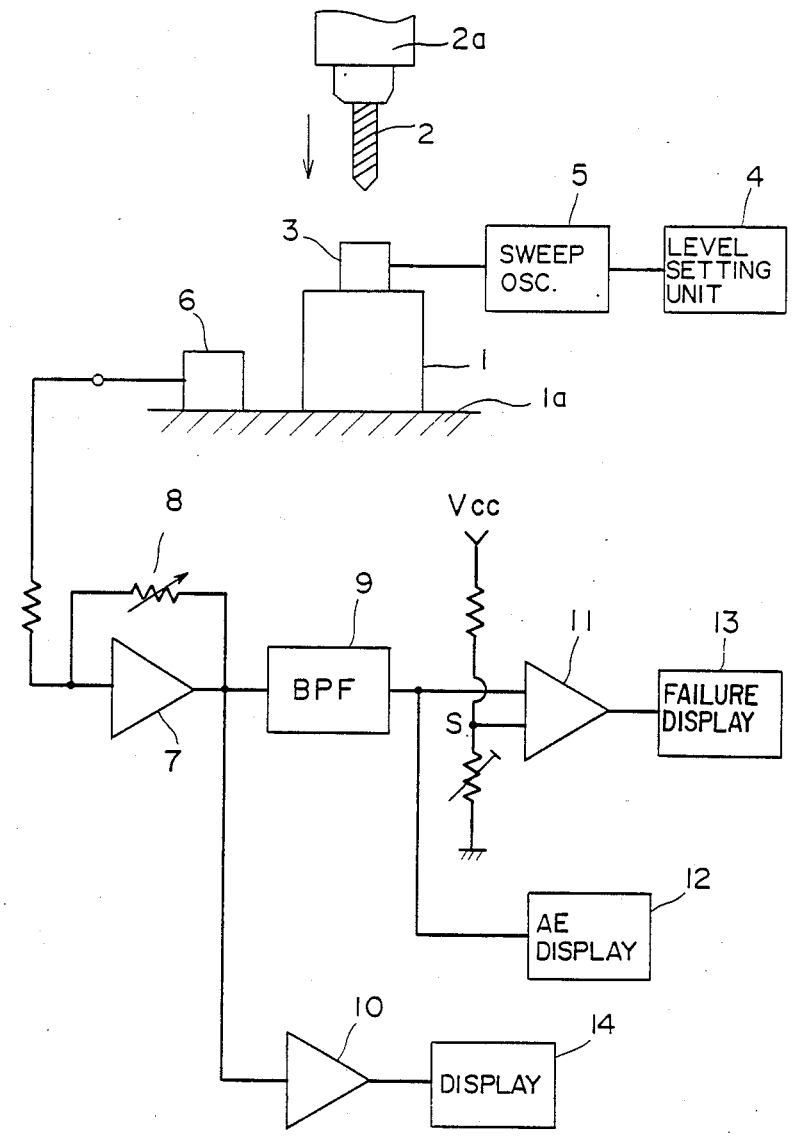
FIG. 1 is a schematic block diagram of a tool monitoring system, as a first embodiment according to this invention.

Referring, now, to FIG. 1, there is shown a tool monitoring system as a first embodiment of this invention. A workpiece 1 is fixed on a table 1a of a machine tool or a drill by a vice (not shown in drawings), and adapted to be drilled by moving a rotating drill 2 downwardly. Prior to such drilling, an AE signal transducer or converter 3 is mounted on the workpiece centered under a spindle portion 2a of the drill 2. A level setting unit 4 is so connected with a sweep oscillator 5 that the oscillator 5 continuously oscillate sweeping a predetermined frequency range, for example, between 100 KHz and 300 KHz in accordance with a level set by the level setting unit 4 so as to drive the oscillator 5. Thus, artificial failure signal generating means is substantially composed of AE signal converter 3, level setting unit 4 and sweep oscillator 5 to apply an artificial failure signal to the machine tool. An AE sensor 6 is located near a tool where the workpiece 1 is mounted. In FIG. 1, the AE sensor 6 is mounted on the table 1a to sense an AE signal, and is so designed to convert an AE signal to an electric signal within a range of 1 KHz and 1 MHz for application to an amplifier 7. The AE signal converter 3 and the AE sensor 6 in this embodiment employ PZT or a piezo-electric ceramic formed from titanium-zirconium acid lead, but may employ other converting elements, if desired. An amplification degree of the amplifier 7 is selectable by adjusting a resistance of a varible resistor 8, and an output from the amplifier 7 is applied to a band pass filter (BPF) 9 and a driving amplifier 10 for a display 14. The AE signal from the amplifier 7 has a frequency component having a peak below 100 KHz in a normal cutting operation, producing no scrap, as illustrated by a curve b in FIG. 2, and a peak at about 300 KHz in an abnormal operation, such as tool failure or scraps, as illustrated by a curve a in FIG. 2. Therefore, the band pass filter 9 is designed to pass a signal having a frequency of the AE signal generated in a tool failure of the drill 2, for example, a signal between 100 KHz and 300 KHz. An output signal from the band pass filter 9 is applied to a comparator 11 and an AE display 12 for displaying a level of the AE signal. The comparator 11 generates a tool failure signal for application to a failure display 13 when the AE signal from the filter 9 is higher than a predetermined reference level S. The display 12 displays the AE signal passing the filter 9 which is generated by scraps or friction, and the display 14 is actuated by any signal generated from the amplifier 10 during a cutting operation.

Figure 3:
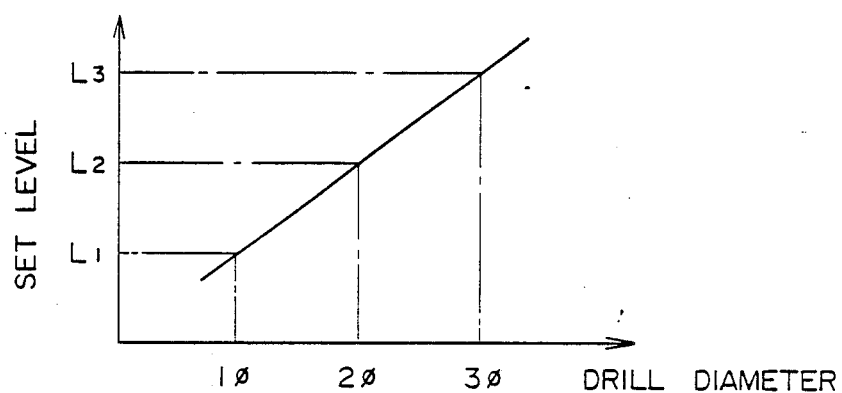
FIG. 3 is a graph illustrating the level of an artificial failure signal which is set according to different diameter drills.

The operations for setting the AE sensor 6 in this embodiment will be described hereinafter. For a change of a in the type of a tool or replacement of a drill, the respective AE signals on drill failure corresponding to drill diameters 1φ, 2φ and 3φ are set to predetermined levels L1, L2 and L3 as illustrated in FIG. 3. The sweep oscillator 5 is therefore intermittently driven by the level set by the level setting unit 4 to apply an artificial failure signal to the workpiece 1 through the AE signal converter 3.

Figure 4:
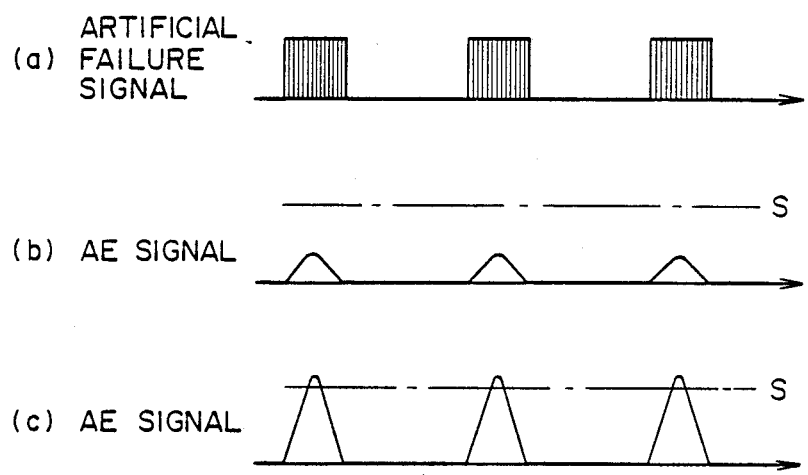
FIGS. 4(a), 4(b) and 4(c) illustrate an artificial failure signal applied to an AE signal transducer employed in the system, and received AE signals from the AE sensor.

The artificial failure signal generated from the oscillator 5 is illustrated in FIG. 4(a). The AE sensor 6 intermittently or cyclically receiving the artificial failure AE signal within a range between 100 KHz and 300 KHz generates an electrically converted AE signal for application to the amplifier 7 and the band pass filter 9. The sweep oscillator 5 is already set to a sweeping frequency between 100 KHz and 300 KHz corresponding to the frequency of the AE signal representing a tool failure, the signal from the oscillator 5 is passed to the comparator 11 and the display 12. In order to find a proper level by the display 12, the mounting position or status of the AE sensor and the amplitude degree or factor of the amplifier 7 varying as the variable resistor 8 are adjusted. Since the level of the artificial failure signal oscillated from the oscillaror 5 is herein designed to be equal to that of the AE signal when the tool is broken, the threshold level of the comparator 11 is set to a level much higher than the AE signal. Exemplarity, if the AE signal passing through the filter 9 is lower than the reference level S as illustrated in FIG. 4(b), the received AE signal is modified to be higher than the level S as illustrated in FIG. (c) by mounting the AE sensor 6 closer to the workpiece 1, fixing the same to a base of the workpiece, or enlarging the amplification degree of the amplifier 7 so that the tool monitoring system be adjusted to a proper status.

After the adjustment, the AE signal converter 3 is removed from the workpiece 1, and the workpiece is cut by the drill 2 rotating. Thus, mounting of the AE sensor 6, the amplification degree of the amplifier 7 and the reference level of the comparator 11 are set properly so that the AE signal by an actual failure of the drill 2 is obtainable without any affection by scraps or friction. If the drill 2 is necessary to be replaced with a different diameter drill, e.g. 3φ, the level setting unit 4 should be set to the level L3 as shown in FIG. 3 and the AE signal converter 3 be mounted on the workpiece 1 so that an artificial failure signal be intermittently applied to the work 1 by driving the sweep oscillator 5. If the driving or rotation speed of the drill, the kind of the work, or other cutting condition is changed, the artificial failure signal level corresponding to the cutting condition is set by the unit 4. Moreover, the position or the status of the AE sensor 6 or the amplifiation degree or ratio of the amplifier 7 is changed that the tool monitoring system may precisely detect actual failure of the tool.

The artificial failure signal oscillating section in this embodiment employs the sweep oscillator which intermittently oscillates at a sweeping frequency between 100 KHz and 300 KHz, but may employ a noise oscillator which generates a fixed frequency signal obtainable on actual tool failure to drive the AE signal converter.

Figure 5:
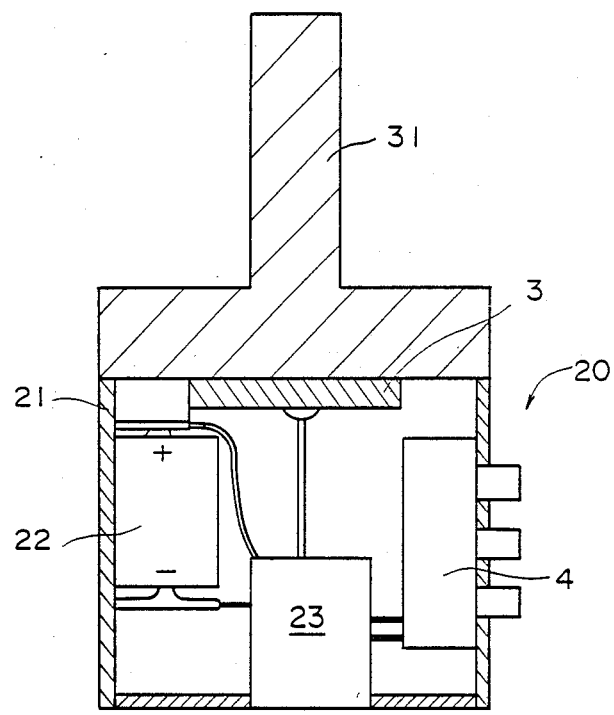
FIG. 5 is a sectional view of a modified artificial failure signal generator which may be alternatively employed in the tool monitoring system of FIG. 1.
Figure 6:
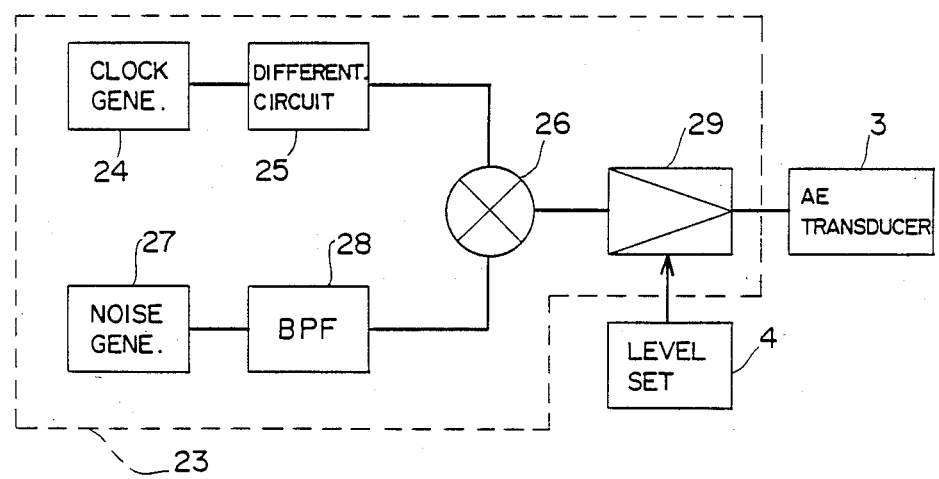
FIG. 6 is a schematic block diagram of the artificial failure signal generator of FIG. 5.

FIG. 5 shows a sectional view of a modified artificial failure signal generator 20 which may be alternatively employed in the tool monitoring system of this embodiment, and FIG. 6 shows a schematic block diagram illustrating an electronic construction of the generator. Within a housing 21 of the artificial failure signal generator 20 there are disposed a battery 22 and a driving circuit 23 providing an artificial failure signal oscillating section of this system. As illustrated in FIG. 6, the driving circuit 23 includes a clock generator 24 for generating a square-shaped clock signal at a predetermined cycle, a differentiation circuit 25 for differentiating an output from the generator 24 to generate a substantially triangular-shaped output signal, a noise generator 27 for generating a white noise signal having uniformal frequency distribution, a band pass filter 28 for only passing a frequency component around 300 KHz of the generated white noise signal, a multiplier 26 associated with the circuit 25 and the filter 28 for generating an artificial failure signal which is enveloped by an output signal from the circuit 25, and an amplifier 29 for amplfying the artificial failure signal generated from the multiplier 26 at an amplification degree selected by level setting unit 4. The amplified artificial failure signal from the amplifier 29 is applied to AE signal transducer 3 fixed on an inner wall of the housing 21. The transducer 3 employs a piezo-electric element to convert an applied electric signal to a mechanical signal so that the artificial failure signal is applied to a tool supporting portion of the machine tool. An upper portion of the housing 21 employs a metal member whereby the AE signal is easily transmitted, and has a cylindrical projection 31 with predetermined diameter corresponding to the diameter of a drill to be used.

Figure 7:
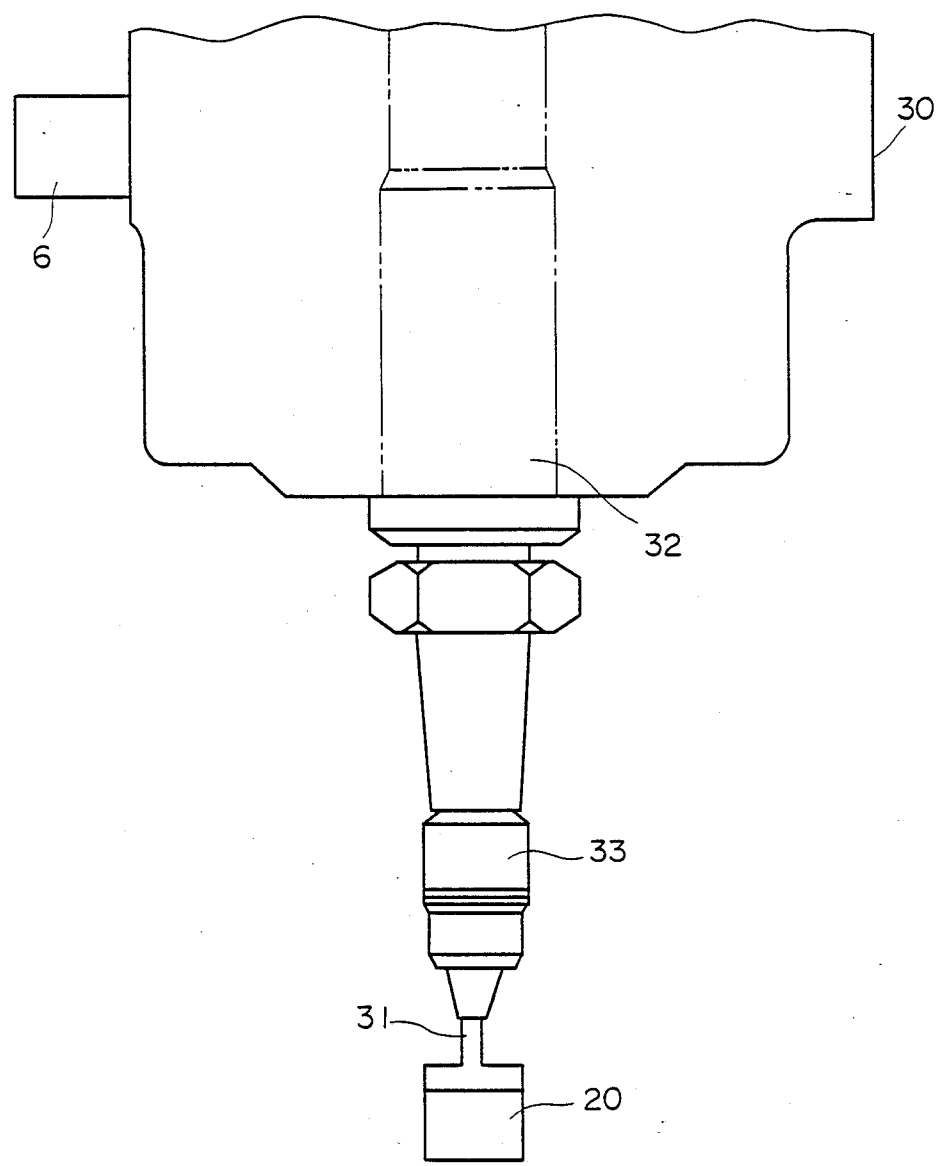
FIG. 7 shows a side view of the artificial failure signal generator mounted in a machine tool.

As illustrated in FIG. 7, the artificial failure signal generator 20 is adapted be installed into the tool supporting portion 30. A spindle 32 is rotatably supported by the portion 30 through a bearing (not shown in drawings), and at its bottom end includes a chuck or tool receptacle 33 for mounting a drill. Though a bottom end of the chuck 33 is normally attached by a selected drill, it is attached by the generator 20 at its cylindrical projection 31 to adjust the sensitivity of the AE sensor 6 for initiating the tool monitoring system. The AE sensor 6 is mounted on a side of the supporting portion 30 as shown in FIG. 7.

The sensitivity of the AE sensor 6 is adjusted after setting an artificial failure signal level with the level setting unit 4 corresponding to tool diameters as described in the embodiment of FIG. 1. If a desired tool is attached to the chuck 33 instead of the generator 20 after the adjustment, the tool monitoring system can sense tool failures at the best sensitivity by AE signals obtained on actual tool failures.

Figure 8:
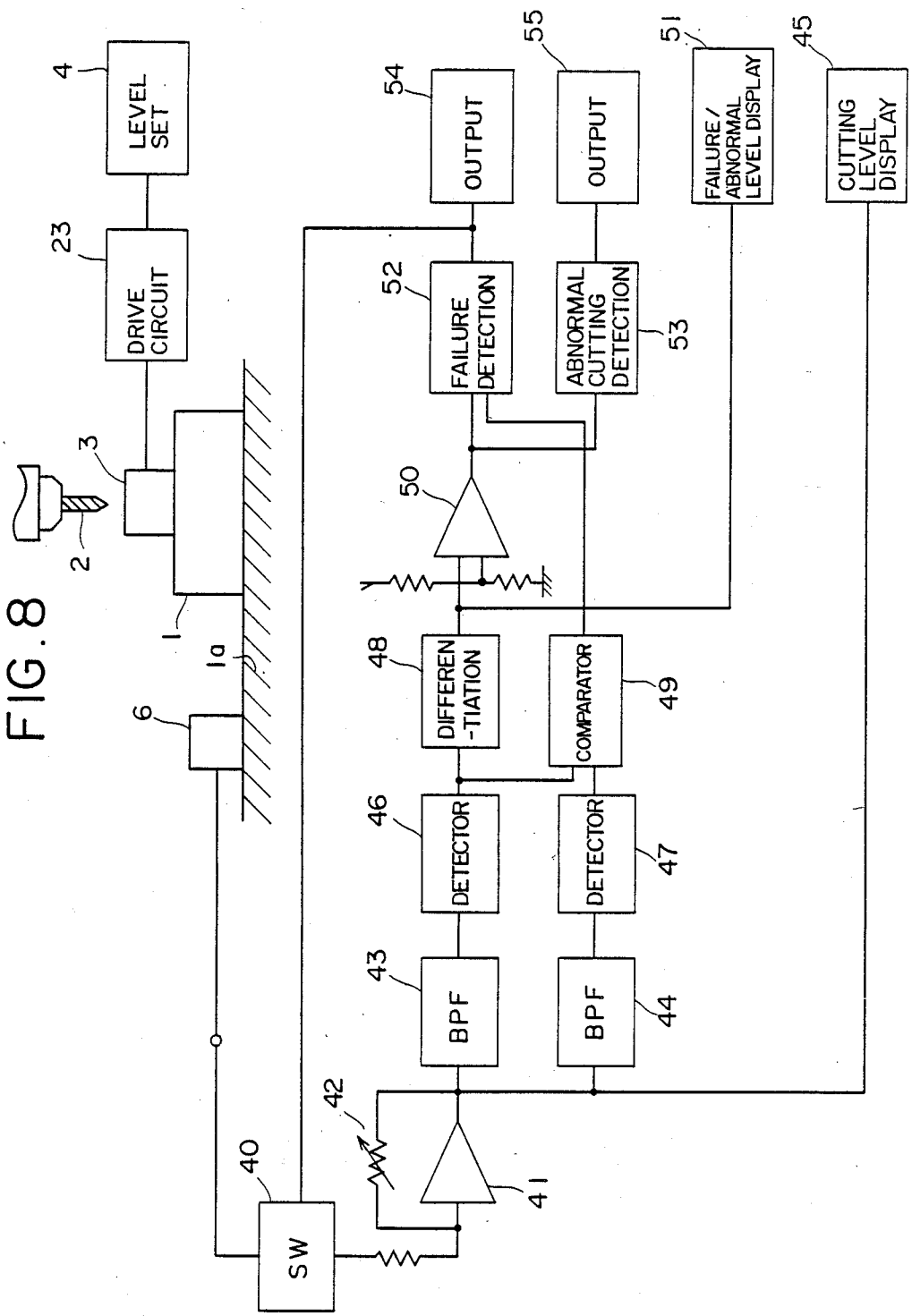
FIG. 8 is a schematic block diagram of a tool monitoring system, as a second embodiment of this invention.

Referring to FIG. 8 there is shown a tool monitoring system as a second embodiment of this invention. In the same manner as that of the above-mentioned embodiments, this tool monitoring system is adapted to detect tool failures by adjusting the sensitivity of an AE sensor associated with an artificial tool failures signal generator and processing the frequency and time characteristics of an AE signal which is developed from the AE sensor on a tool failure. The same components of FIG. 8 as those of the foregoing embodiments are represented by the same reference numerals. AE signal transducer 3 is mounted on work 1 and driven by driving circuit 23 set by level setting unit 4. The driving circuit 23 oscillates an artificial tool failure signal having a driving wave form which is similar to the AE output waveform representing a tool failure obtained from the noise generator and its associated components of FIG. 6 and has a power spectrum distribution identical to the same. The AE sensor 6 is also mounted on a table 1a, and is connected to an analog switch 40 for switching an analog signal applied by the sensor 6 in accordance with an external signal from a tool failure detection circuit 52. An amplifier 41 is designed to have a variable amplification degree adjusted by a variable resistor 42 and to amplify an input signal from the switch 40 for application to a pair of band filters 43 and 44 and a cutting signal level display 45. The filters 43 and 45 ar designed to pass signals around central filtering frequencies 300 KHz and 50 KHz to detectors 46 and 47, respectively. The detectors 46 and 47 are adapted to detect input signals applied thereto and generate output signals proportional to amplitudes of the detected input signals. The output signal from the detector 46 is applied to a differentiation circuit 48, and a comparator 49, and the output signal form the detector 47 is applied to comparator 49. Thus, frequency discriminating means for discriminating an AE signal on tool failures is constituted by filters 43 and 44, detectors 46 and 47, and comparator 49. The differentiation circuit 48 provides a level detector 50 and a failure or abnormal level display 51 with a rapid differential component of the input signal applied to the circuit 48. The detector 50 compares the signal from the circuit 48 with a reference level to apply an input signal larger than the reference level to tool failure detection circuit 52 and abnormal cutting detection circuit 53. The circuit 48 and the detector 50 provide rising signal detecting means for detecting a rapidly rising component of the signal from the detector 46. The comparator 49 compares the output from the detection 46 with that from the detector 47 to generate an output for application to the circuit 52 when the former is larger than the latter. Thus, the tool failure detection circuit 52 serves as a logic circuit for detecting a tool failure by taking the logic product of the inputs, and generates an output signal externally through an output circuit 54 with closing the analog switch 40. The abnormal cutting detection circuit 53 detects an abnormal cutting upon the output of the level detector 50 for application to an external component through an output circuit 55.

Operations for mounting the AE sensor of this embodiment or a drill will be described hereinafter as an example though it is applicable to other tool machine, such as machining center, milling machine, special machine, grinder or the like. After mounting the AE sensor 6 on a predetermined location of the table 1a of the drill, the level setting unit 4 is set to a predetermined level according to the sort of the machine tool to drive the driving circuit 23, whereby an AE signal is applied to the sensor 6 through the workpiece 1 and the table from the AE signal transducer or pulser 3. The artificial failure signal produced by the AE sensor 6 has the same power spectrum as that of an actual tool failure, and a waveform similar to that of the same in a time region. The variable resistor 42 is adjusted according to the level defined by the level setting unit 4 so that the amplification degree of the amplifier 41 be so adjusted to supply the subsequent signal processing section with a proper AE signal. This makes it possible that the same level signal as an actual tool failure signal is applied to the signal processing section even if the damping factor of the AE signal is not found in the mounting construction between the tool and the AE sensor 6.

Figure 2:
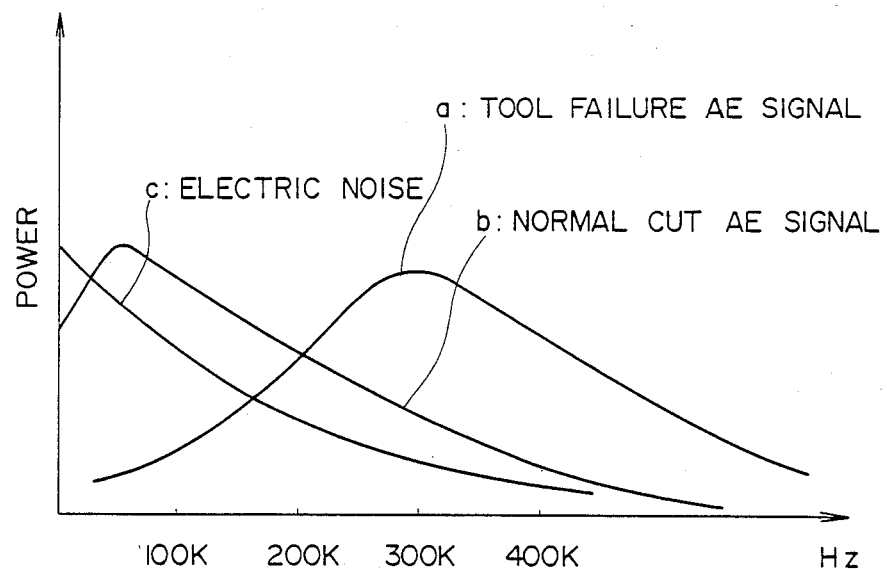
FIG. 2 shows a power spectrum of an AE signal generated from an AE sensor employed in the system.

As illustrated by curves a and b of FIG. 2, the power spectrum distribution of the AE signal produced by the AE sensor 6 has a peak around 300 KHz upon occurrence of an actual tool failure. This seems to be based on a specific ultrasonic phenomenon appearing on the nonplastic destruction of the tool as a signal source without any affection by mechanical vibrations. Thus, the tool failure and the normal cutting are discriminated by comparing the outputs from the detectors 46 and 47 which respectively detect the frequency components of the AE signal filtered by the filters 43 and 44. The comparison is performed by the comparator 49 to apply an output signal to the detection circuit 52 upon a tool failure.

Figure 9:
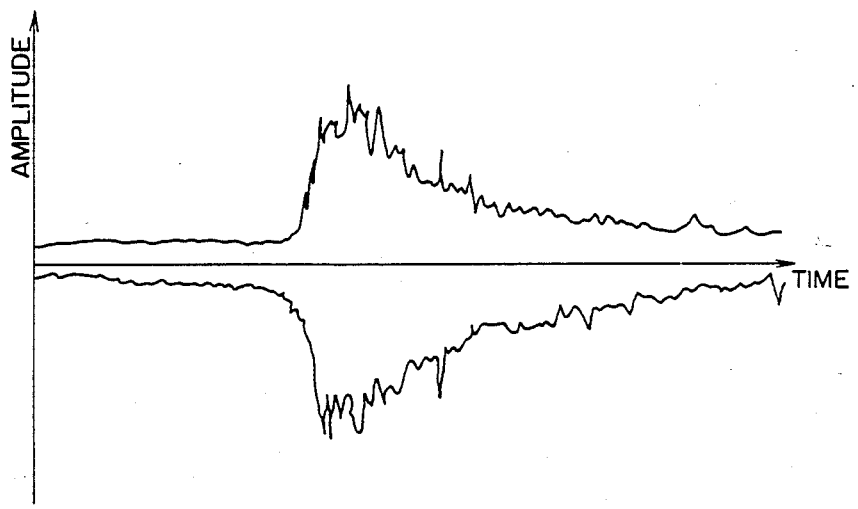
FIGS. 9(a) and 9(b) respectively show AE signal waveforms on occurrence of tool failure and generation of scraps.
Figure 9:
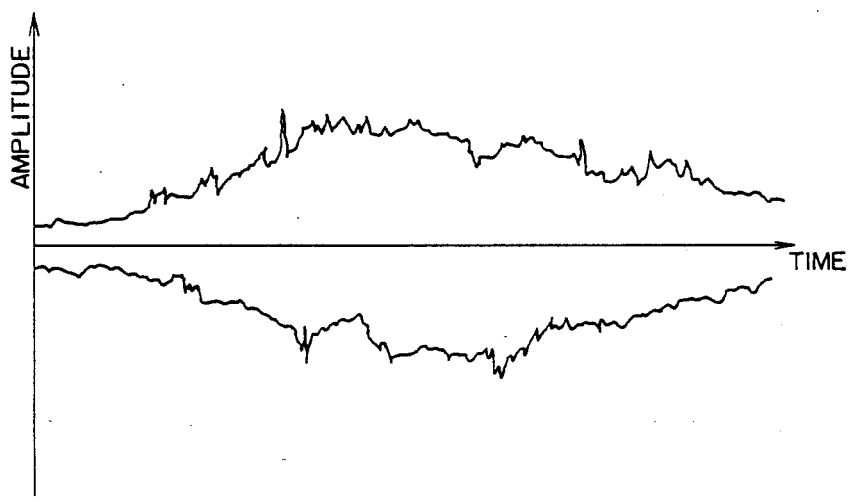

There is a case where a similar signal to the power spectrum represented by the curve a of FIG. 2 is generated by contact or friction between scraps and tool works in cutting. In this case, even if the central frequencies and Q values of the band-pass filters 43 and 44, the threshold level of the comparator 49 or the like are properly adjusted, the signal caused by the contact or friction between scraps and tool or work is sometimes erroneously judged to be a tool failure signal. Accordingly, in this embodiment, a time component of the AE signal upon tool failure is watched to be discriminated from the similar signal. The AE signal waveform developed in an actual tool failure has a sharp rising curve on tool failure as exemplarily illustrated in FIG. 9(a), while the AE signal waveform developed by contact or friction among scraps, tool and work has a dull rising curve as illustrated in FIG. 9(b). Therefore, the output signal from the detector 46 is applied to the differentiation circuit 48 so that only a sharp signal component on a tool failure is extracted for application to the level comparator 50. The comparator 50 compares the sharp signal component with a reference level to apply an output representing the AE signal having a sharp component to the tool failure detection circuit 52 which detects a tool failure. Thus, tool failure detection is ensured by combining the failure detection in frequency component with failure detection in time component.

Other noise generated in a tool machine, such as a spiked electric noise on switching a plunger or the like, might be applied to the comparator 50 through filter 43, detector 46 and circuit 48, but an output is not generated from the comparator 49 since the power spectrum of it has a monotonous decreasing distribution as represented by the curve c of FIG. 2. An impulse wave generated by a substance hitting on the workpiece 1 or the table thereof is mechanical vibration a power spectrum of which centers on a low frequency and fairly damps around 300 KHz, so that no output is generated from the comparator 49 and no tool failure signal is generated by such impulse wave. Thus, if a tool failure is detected, a tool failure signal is developed, whereby the analog switch 40 is turned off to inhibit further input of AE signal thereafter and maintain a cutting level on the display.

Returning to FIG. 10, there is shown a tool monitoring system as a third embodiment of this invention. A level of an artificial tool failure signal is provided by a numerical control (NC) unit 64 which operates a tool machine in accordance with the operations by a control circuit employing a central processing unit (hereinafter referred as CPU) 62, and an AE signal processing unit 60 is designed to detect a tool failure by analyzing an AE signal from an AE sensor with respect to frequency and time regions as illustrated in the above-mentioned second embodiment. The same components of this embodiment as those of the foregoing embodiments are represented by the same reference numerals.

Figure 10:
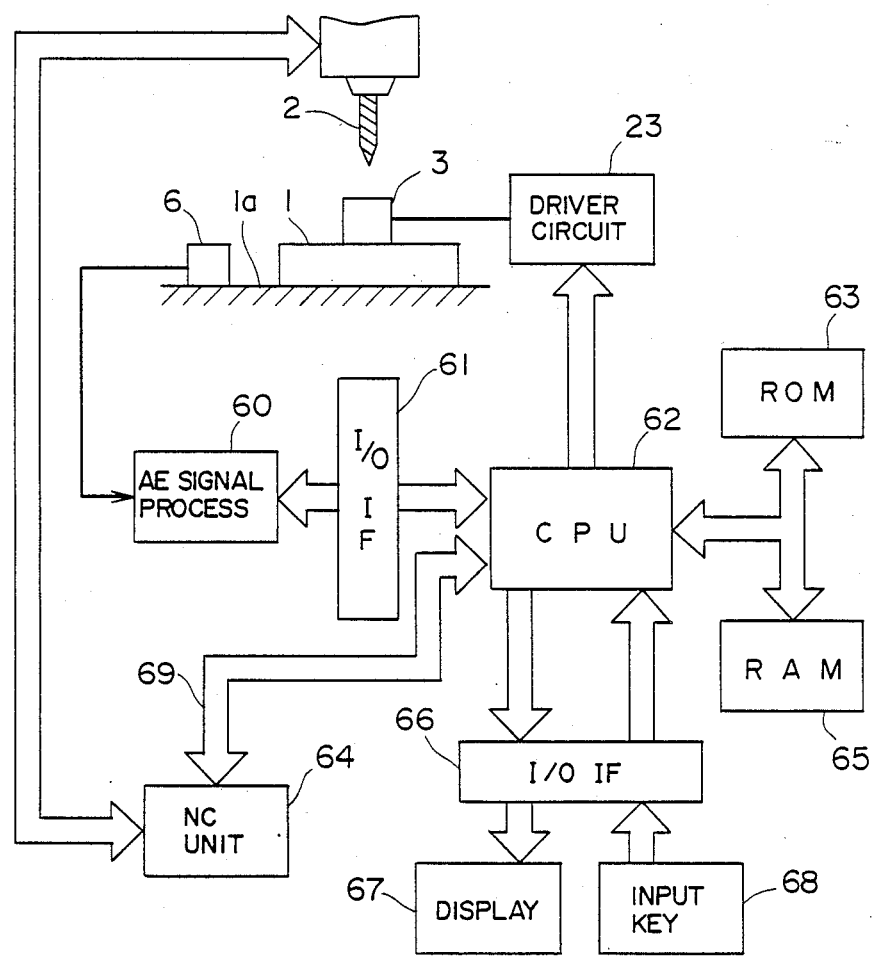
FIG. 10 is a schematic block diagram of a tool monitoring system, as a third embodiment of this invention.
Figure 11:
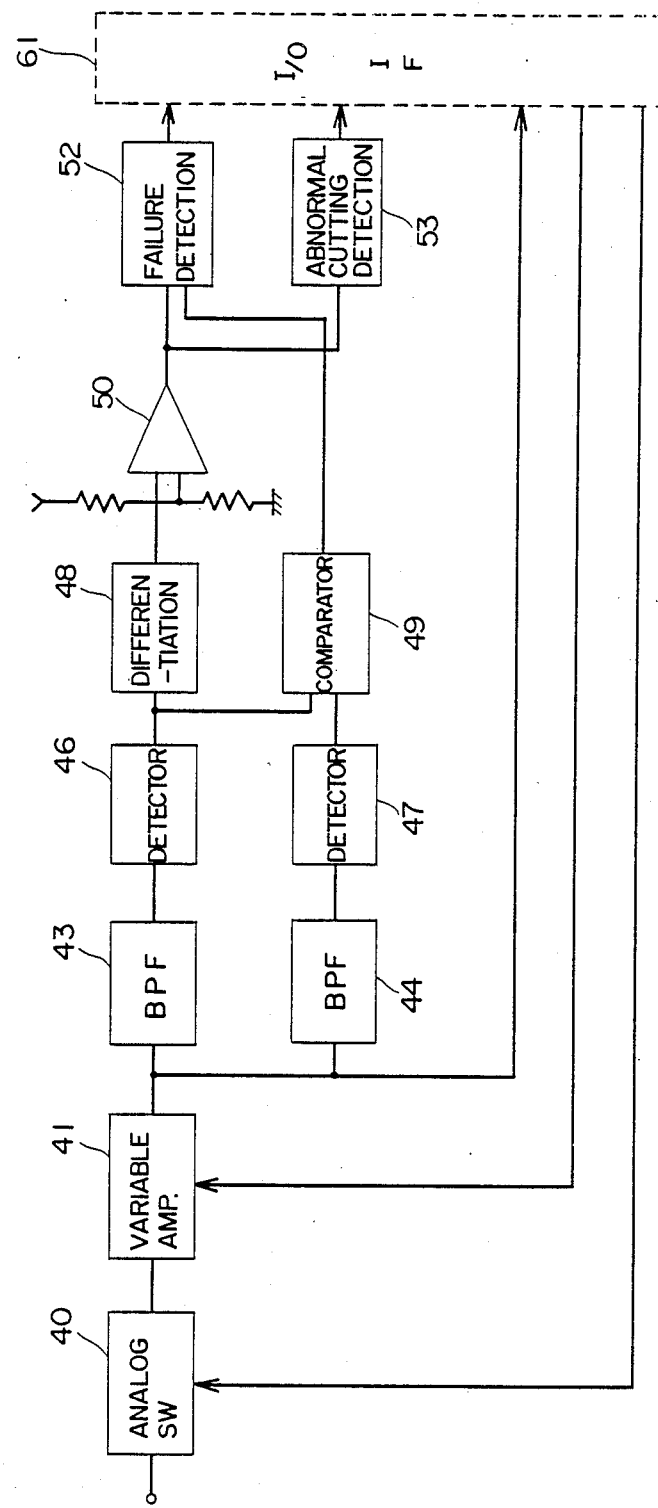
FIG. 11 shows a detailed block diagram of an AE signal processing unit.

As illustrated in FIG. 10, AE signal transducer 3 is mounted on workpiece 1 adjusting the sensitivity of AE sensor 6 in the same manner as that of the above-mentioned second embodiment of FIG. 8. The transducer or pulser 3 emits a sound which simulates that of break of drill under stress. The simulated sound or artificial tool failure sound travels from the work 1 through a vice (not shown in drawings) to the table 1a. The AE sensor 6 should be fixed at such a location along this route where the simulated sound can be reliably detected even if it is damped during transmission The AE sensor 6 is connected to the AE signal processing unit 60 having a construction shown in FIG. 11 which is similar to the construction of FIG. 8. In FIG. 11, the AE signal processing unit 60 includes analog switch 40, variable amplification degree amplifier 41 which amplifies an output from the switch 40 in accordance with an amplification degree externally set by the CPU 62 through I/O interface 61, a pair of band pass filters 43 and 44 for receiving the output from the amplifier 41, and components 46 to 53 which constitute frequency discriminating means and rising signal detecting means in the same manner as that of FIG. 8. The tool failure detection circuit 52 and the abnormal cutting detection circuit 53 in this embodiment are associated with the CPU 62 through I/O interface 61.

The CPU 62 is associated with a random-access-memory (hereinafter referred as RAM) 65 for storing information about the sensitivity correspoinding to the tool employed by the numeric control unit 64 and a read-only-memory (hereinafter referred as ROM) 63 for storing a system program. The CPU 62 is further associated through I/O interface 66 with a display 67 for displaying an AE signal level in cutting, abnormal tool cutting and a tool failure and an input key 68 for setting a number or sort of a tool and a standard sensitivity of the AE sensor, and through a signal transmission line 69 with the numerical control unit 64. The CPU 62 supplies the driving circuit 23 with a predetermined driving level for the transducer 3 in accordance with inputs from these associated components, detects the most proper sensitivity based on the AE signal level obtained from the AE signal processing unit 60, and stores the sensitivity into RAM 65 for thereafter setting it when the tool corresponding thereto is employed.

Figure 12:
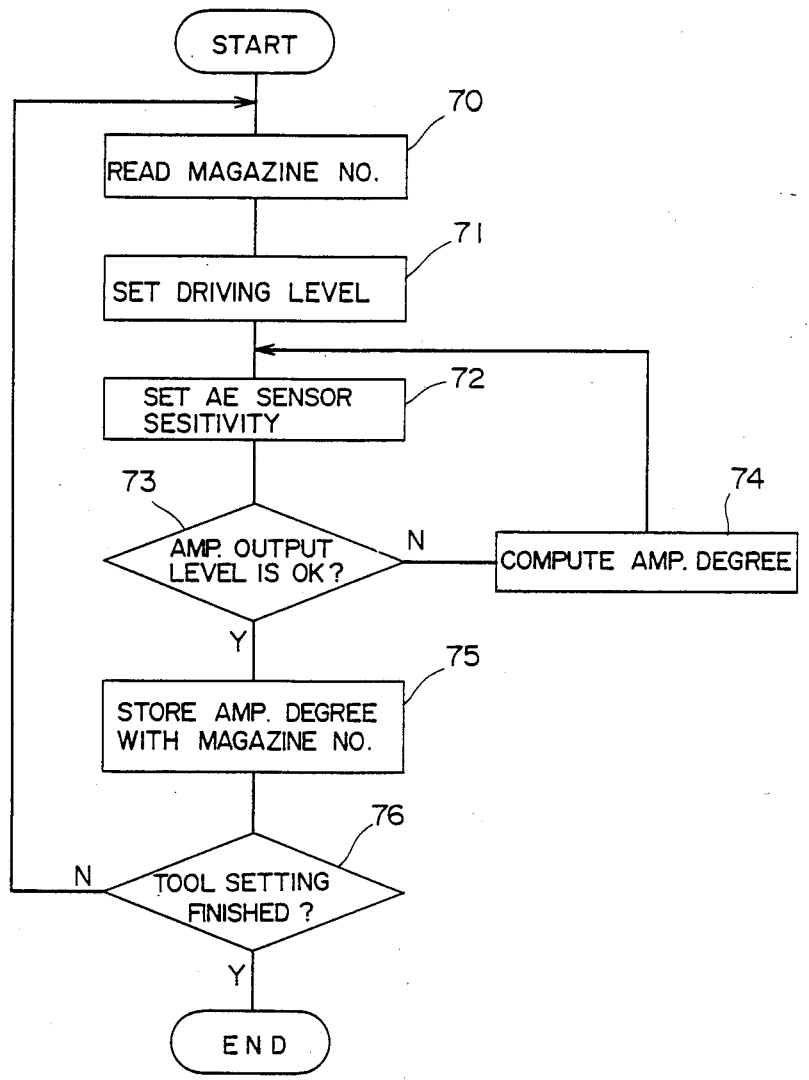
FIG. 12 is a flow chart illustrating automatic setting operations for the sensitivity of the tool monitoring system of FIG. 10.
Figure 13:
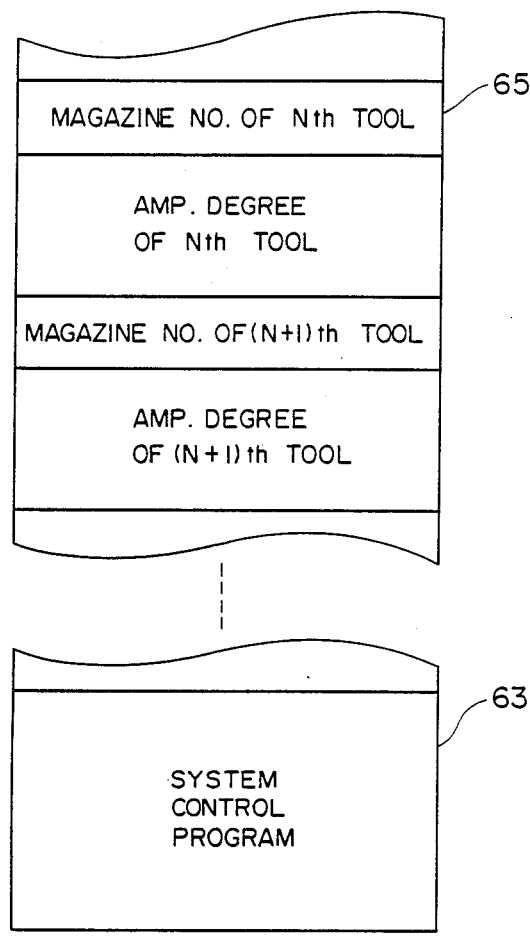
FIG. 13 is a storage map illustrating the storage of the amplification degrees corresponding to the respective tools in the chart of FIG. 12.

The operations of the tool monitoring system will be described hereinafter. FIG. 12, upon starting the system, the data corresponding to the scale of a tool employed in the system, viz., a magazine number, which is entered through the input key 68 by an operator, is read (step 70). A driving level for the AE transducer 3 corresponding to the scale is applied to the driving circuit 23 (step 71). The driving circuit 23 applied by the driving level drives the AE signal transducer 3 to apply an artificial tool failure signal through the workpiece 1 and the table 1a to the AE sensor 6. The artificial tool failure signal has a power spectrum identical to that of an actual tool failure and, in time region, a waveform similar to that tool failure, so that it is applied to the CPU 62 through the AE signal processing unit 60 and the I/O interface 61 from the AE sensor 6. Then, the CPU 62 in a step 72 adjusts the signal level from the AE sensor 6 to a predetermined level by the amplification degree of the amplifier 41, and in a step 73 inquires if the output from the amplifier 41 is at a predetermined level. If it is not at the level, a predetermined decrease or increase of the amplification degree is computed in a step 74 so that the amplification factor of the amplifier 41 is corrected in the step 72. By repeating the sequence from 72 to 74, the amplification degree is so adjusted to the best degree to bring the output from the amplifier 41 to the predetermined level, so that the best amplification degree is stored in a predetermined storage area of RAM 65 together with the magazine number (step 75). In a step 76, it is inquired if all operations for setting the tool are completed. Unless it is completed, the sequence from the step 76 returns to the step 70 to repeat the above-mentioned operations. Thus, the sensitivity setting operations are finished by adjusting the sensitivity values for all tools employed by the numeric control unit 64 and successively storing magazine numbers of the all tools with the respective best amplification degrees as illustrated in a memory map of the RAM 65 in FIG. 13.

Figure 14:
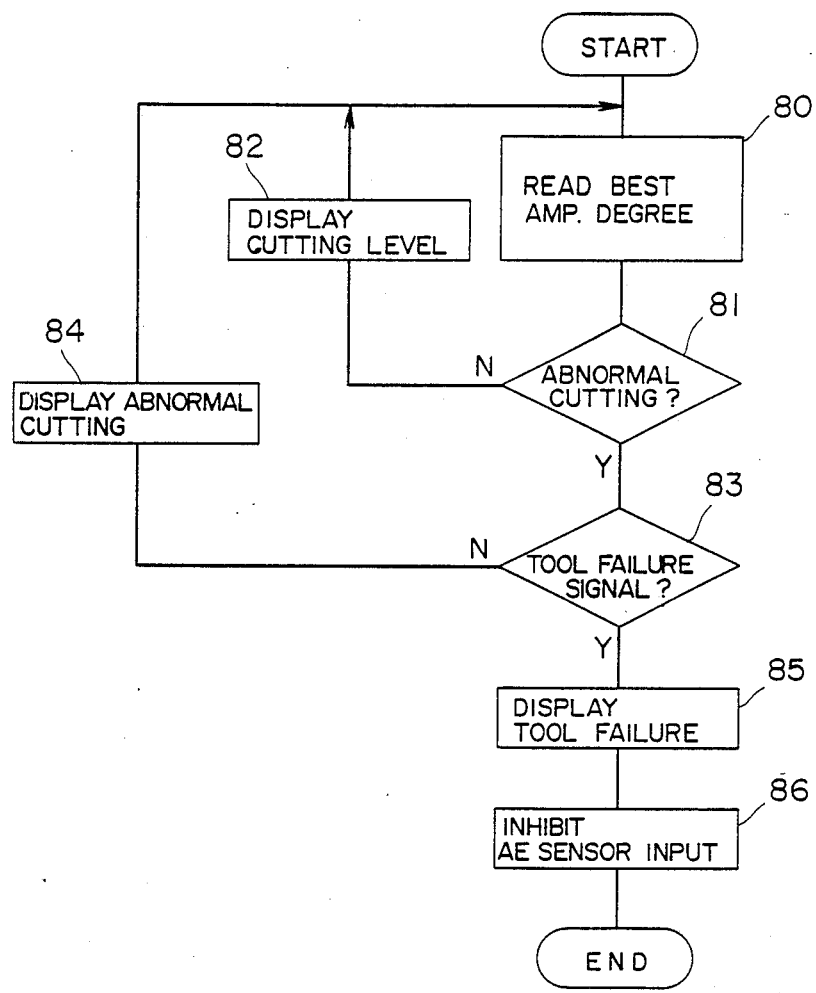
FIG. 14 is a flow chart illustrating operations for monitoring a cutting status.

In FIG. 14, there are illustrated operations for monitoring a tool failure by employing the data of the best amplification degrees corresponding to the respective tools which are set according to the above-mentioned operation. Upon starting the monotoring operations by removing the pulser 3 from the workpiece 1 and beginning an actual drilling operation, the best amplification degree corresponding to the tool mounted on the tool machine is read out from the RAM 65 so as to set the amplificatio factor of the variable amplification degree amplifier 41 in the AE signal processing unit 60 to the best degree through the I/O interface 61 (step 80). Then, an AE signal from the AE sensor 6 is applied to the AE signal processing unit 60 to be amplified at the best amplification degree. The AE signal is processed in frequency region and time region by the processing unit 60 as processed in the above-mentioned second embodiment. In a step 81, the CPU 62 inquires if an abnormal cutting signal is generated from the detection circuit 53. Unless there is generated the abnormal cutting signal, normal cutting operations are made, so that a cutting level is indicated by the display 67 in a step 82. The sequence returns to the step 80, and the steps 80 to 82 are repeated to monitor abnormal cutting. If an abnormal cutting signal appears from the abnormal cutting detection circuit 53, the sequence from the step 81 is advanced to a step 83 where it is inquired if any tool failure signal is generated from the tool failure detection circuit 52. The circuit 52 detects any tool failure with the logic product by the comparator 49 and the level comparator 50 so that a tool failure signal is applied to the CPU 62 through the I/O interface 62 upon a tool failure. Absence of the tool failure signal in the step 83 represents an abnormal cutting, so that the abnormal cutting is displayed by the display 67 in a step 84 and the sequence from the step 83 returns to the step 80. If any tool failure is sensed by a tool failure signal in the step 83, the tool failure is indicated by the display 67 in a step 85 to apply the tool failure signal to the numeric control unit 64 for stopping the same. The sequence advance to a step 86 in which the analog switch 40 is turned off to finish the operations.

Though tool failures are detected by processing data in the AE signal processing unit 60 on an analog basis, this tool monitoring system of this embodiment may be modified in such a manner that the output signal from the AE sensor 6 is converted into digital data to be sampled and the sampled data is processed on a digital basis in its all associated downstream components. For this purpose, the band-pass filter may be replaced with a digital filter, and the differentiation circuit be with a differential operator.

The storage area for storing the magazine number for each tool and its corresponding amplification degree may be employed in a memory within the numerical control unit. The AE sensor 6 may be alternatively fixed to the spindle head of the drill as illustrated in FIG. 7. The tool monitoring system applied to the drill of this embodiment may be applied to other tool machines, such as various milling machines, large scale machining centers, grinders or the like.

It should be understood that the above-mentioned descriptions are merely illustrative and various further modifications are possible without departing from the scope of the invention.

What is claimed is:

1. A tool monitoring system for detecting a failure of a tool employed in a tool machine, comprising
    artificial signal generating means for generating a predetermined artificial tool failure signal simulating the acoustic emission signal obtained in an actual failure of the tool,
    acoustic emission transducing means adapted to be mounted at least temporarily during a setting mode on the tool machine near the tool and driven by said artificial signal generating means for applying said artificial tool failure signal to the tool machine,
    acoustic emission sensing means mounted on the tool machine near the tool so as to receive, in a setting mode of said system where said transducing means is mounted on the machine, said applied artificial tool failure signal form said acoustic emission transducing means through the tool machine and to receive in a monitoring mode of said system where the tool is operated, an actual tool failure signal if said tool fails, said acoustic emission sensing means converting said artificial signal or an actual tool failure signal into an electrical signal; and
    signal processing means responsive to the electrical signal generated by said acoustic emission sensing means and, in said setting mode of said system, for adjusting a characteristic of said electrical signal for later detection of a tool failure signal, said signal processing means being responsive to said electrical signal generated by said acoustic emissions sensing means, in a monitoring mode of said system, for detecting a failure of said tool, said signal processing means comprising:
    amplying means for adjusting in said setting mode a magnitude of said electrical signal fed from said acoustic emission sensing means to an optimum level reflecting a position of said acoustic emission transducing means;
    storage means for storing an optimum amplification degree of said amplifying means at which a magnitude of said electrical signal is adjusted to said optimum magnitude;
    setting means for, in said monitoring mode of said system where said tool is operated, setting an amplification degree of said amplifying means to said optimum amplification degree stored in said storage means; and
    means responsive to an output of the amplifying means during said monitoring mode for determining the existence of a tool failure.

2. A tool monitoring system according to claim 1, in which said artificial signal generating means includes level setting means for setting the output from the artificial signal generating means to a predetermined level.

3. A tool monitoring system according to claim 1, in which said artificial signal generating means includes a sweep oscillator which continuously oscillates sweeping a predetermined frequency range covering a frequency of an acoustic emission signal of an actual tool failure.

4. A tool monitoring system according to claim 1, in which said artificial signal generating means includes a noise generator for generating a noise signal including a frequency of an acoustic emission signal of an actual tool failure.

5. A tool monitoring system according to claim 4, in which said artificial signal generating means further includes a clock generator for generating a square-shaped clock signal at a predetermined cycle, a differentiation circuit for differentiating said generated square-shaped clock signal, a multiplier for multiplying an output from said differentiation circuit by an output from said noise generator for application to said acoustic emission transducing means.

6. A tool monitoring system according to claim 1, in which said artificial signal generating means and said acoustic emission transducing means are housed within a housing having an attachment portion adapted to be received by a tool supporting portion of the tool machine.

7. A tool monitoring system according to claim 1, in which said signal processing means further comprises frequency discriminating means for generating a first output signal when said electrical signal generated from the acoustic emission sensing means has a frequency component similar to that of an actual tool failure, rising signal detecting means for generating a second output signal when said electrical signal generated from the acoustic emission sensing means has a sharp rising signal component, and logic means for generating a tool failure detection signal based on the logical product of said first and second output signals.

8. A tool monitoring system according to claim 7, in which said frequency discriminating means includes a first band pass filter having a central filtering frequency at which a peak frequency spectrum appears upon a tool failure, a second band pass filter having a central filtering frequency at which a peak frequency spectrum appears in a normal cutting operation, and a comparator for comparing output level of said first and second band pass filters to generate said first output signal.

9. A tool monitoring system according to claim 7, in which said rising signal detecting means includes a differentiation circuit for differentiating said electrical signal from said acoustic emission sensing means to detect sharp amplitude change thereof.

10. A tool monitoring system according to claim 1, in which said storage means respectively stores a plurality of optimum amplification degrees in the storage areas thereof corresponding to a plurality of tools employed in the tool machine.

11. A tool monitoring system according to claim 1, in which said predetermined artificial tool failure signal is similar to the acoustic emission signal of the actual tool failure with frequency spectrum and time dimension.

12. A tool monitoring system according to claim 1 further comprising input means for selectively entering data representing a kind of tool through said input means, and controlling means for reading out the optimum amplification degree from the storage means in accordance with the entered data .

* * * * *